Oct. 17, 1950   H. C. PAULSEN   2,526,499
REFINING HEAVY OILS
Filed May 31, 1946
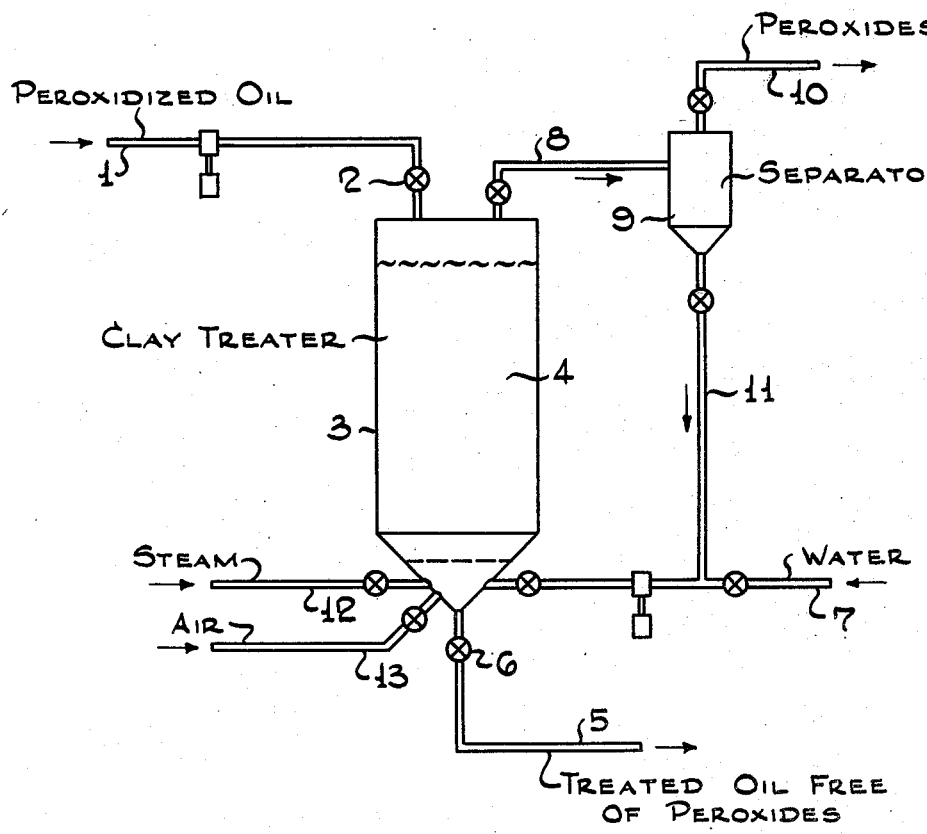
Henry C. Paulsen Inventor
By J. C. Arnold Attorney Patented Oct. 17, 1950

2,526,499

UNITED STATES PATENT OFFICE 2,526,499

REFINING HEAVY OILS

Henry C. Paulsen, Elizabeth, N. J., assignor to Standard Oil Development Company, a corporation of Delaware Application May 31, 1946, Serial No. 673,447

1 Claim. (Cl. 196—147)

This invention relates to the treatment of low boiling highly unsaturated petroleum hydrocarbons, and, more particularly, to those whose properties have deteriorated on storage due to oxidation, polymerization and other reactions among their constituents which give rise to gum and peroxides. It has been observed that cracked hydrocarbons, when stored under the influence of light and oxygen undergo chemical changes which affect adversely the properties of these hydrocarbons. While this invention relates particularly to heavy naphtha, gas oils and other heavy distillates, it also may be used in connection with butadiene, isoprene, and other hydrocarbons which are used in the pure state in the production of synthetic rubber and which often quickly deteriorate to such an extent when stored even for a short time that subsequent heating or distillation results in dangerous explosions, probably due to the formation of easily decomposed peroxides.

Hydrocarbons, when stored, also undergo changes which affect color, increase gum formation, and reduce anti-knock properties. The formation of color in the gasoline is undesirable because changes in color are usually accompanied by the formation of gum and tar-like substances which affect both the sales value of the gasoline and its performance in the motor, particularly in clogging up the feed lines, the moving parts of the carburetor and causing the sticking of the valves in the motor.

Experimental work by various investigators has shown that the reactions which lead to these deleterious properties consist in the addition of oxygent to conjugated di-olefins with the formation of organic peroxides. At first the formation of these compounds is relatively slow, but as they accumulate, the rate of formation is accelerated so that the process becomes autocatalytic and hastens the formation of further quantities of peroxides and exerts a pronounced polymerizing action upon olefins and other polymerizable constituents present. The presence of these peroxides in a gasoline tends to accelerate combustion and increase the knocking propensities of the fuel while the presence of the peroxides in butadiene to be used in the preparation of synthetic rubber makes subsequent handling somewhat dangerous. As the peroxides formed in such a concentrated diolefin appear to be violently explosive, they may be detonated easily by a mild heating or a mechanical shock.

In copending application Serial No. 481,095, filed March 30, 1943, now abandoned, there is disclosed a method for the removal of peroxides from hydrocarbons by contacting with dehydrated bauxite at ordinary temperatures. However, while this method is particular effective in removing peroxides from gasoline, it is relatively ineffective in removing peroxides from higher boiling hydrocarbons such as heavy naphtha, gas oils and other heavy distillates.

It has now been discovered that peroxides can be substantially completely removed from higher boiling fractions of petroleum by contacting them with a bleaching earth such as Attapulgus clay, Floridin, fuller's earth, Olmstead clay, etc., at temperatures between 60° and 120° F., preferably between 70° and 90° F.

For a further understanding of the invention, reference may be had to the accompanying drawing in which the single figure is an elevational view, generally diagrammatic, showing an apparatus embodying the improvements of the present invention.

Referring now to this drawing, a heavy hydrocarbon oil containing peroxides is passed by line 1 provided with valve 2 into treating tower 3 filled with Attapulgus clay 4. The oil is passed downwardly through the clay and removed free of peroxides through line 5 provided with valve 6. The oil is continually passed through the clay in this manner until the clay becomes inactive for peroxide adsorption. Valves 2 and 6 are then closed and water, introduced through line 7, is pumped upflow through the clay and discharged through line 8 into separator 9. In separator 9 the oil and peroxides separate into an upper layer and are removed through line 10. Water, separating as a lower layer is withdrawn from separator 9 through line 11 and recycled to the clay tower 3 until the bulk of the peroxides has been removed. Fresh water is then passed through the clay to liberate the remainder of the peroxides after which the clay bed is treated with steam introduced through line 12 followed by drying with air introduced through line 13.

*Example*

Samples of gasoline, heavy naphtha and gas oil were filtered through 30–60 mesh No. 1 Attapulgus clay and 850° F. burnt (Porocel) bauxite at 75° F. to show the effectiveness of each agent in removing peroxides from varying boiling range stocks. The following table presents the inspections on the stocks before and after filtering.

*Inspections on petroleum stocks*

| Column Number | 1 | 2 | 3 |
|---|---|---|---|
| Samples | Gasoline | Heavy Naphtha | Gas Oil |
| Peroxide No., Original | 2.7 | 1.2 | 1.0 |
| Gravity, °API | 46.5 | 57.1 | 36.5 |
| Distillation: | | | |
| I. B. P., °F | 143 | 302 | 312 |
| 5 | 188 | 309 | 362 |
| 10 | 192 | 317 | 385 |
| 50 | 249 | 334 | 502 |
| 90 | 316 | 359 | 576 |
| F. B. P., °F | 351 | 378 | 614 |
| | Peroxide Number | | |
| Filtered through 30/60 No. 1 Attapulgus Clay:[1] | | | |
| Blend of Vols. 1 to 10 [2] | 0 | -------- | 0 |
| Blend of Vols. 1 to 20 | 0.1 | 0 | 0 |
| Volume 21 | 0.4 | 0 | 0 |
| Filtered through 850° F. Burnt Bauxite:[1] | | | |
| Blend of Vols. 1 to 10 [2] | 0 | -------- | 0.1 |
| Blend of Vols. 1 to 20 | 0 | 0 | 0.3 |
| Volume 21 | 0 | 0 | 0.8 |

[1] Treating conditions 3 volumes of feed per volume of treating agent per hour at about 75° F.
[2] 21 volumes treated. Results are based on average of first 10 volumes; first 20 volumes and twenty-first volume.

The above data show conclusively the advantages of Attapulgus clay for removing peroxides from gas oil over bauxite for the same purpose, Attapulgus clay reducing the peroxide number to 0 while peroxides still remained in the gas oil after percolation through bauxite.

The features and advantages of the present invention are obvious from the consideration of the preceding specification and numerical data presented, although neither should be construed as imposing undue limitations upon the invention's generally broad scope.

The nature and objects of this invention having thus been set forth and specific examples of the same given, what is claimed as new and useful and desired to be secured by Letters Patent is:

A process for removing peroxides from gas oil comprising contacting the gas oil at temperatures between 70° and 90° F. with a clay consisting of Attapulgus clay and maintaining such contact at such temperature for a period of time sufficient to remove said peroxides from said gas oil.

HENRY C. PAULSEN.

REFERENCES CITED

The following references are of record in the file of this patent:

UNITED STATES PATENTS

| Number | Name | Date |
|---|---|---|
| 1,295,308 | Handy | Feb. 25, 1919 |
| 1,665,845 | Cox | Apr. 10, 1928 |
| 1,823,175 | Stafford | Sept. 15, 1931 |
| 2,076,524 | Behrens | Apr. 13, 1937 |
| 2,170,628 | Breth | Aug. 22, 1939 |
| 2,202,806 | Alton | May 28, 1940 |
| 2,204,234 | Schulze | June 11, 1940 |
| 2,219,726 | Seaton | Oct. 29, 1940 |